Figure 1:
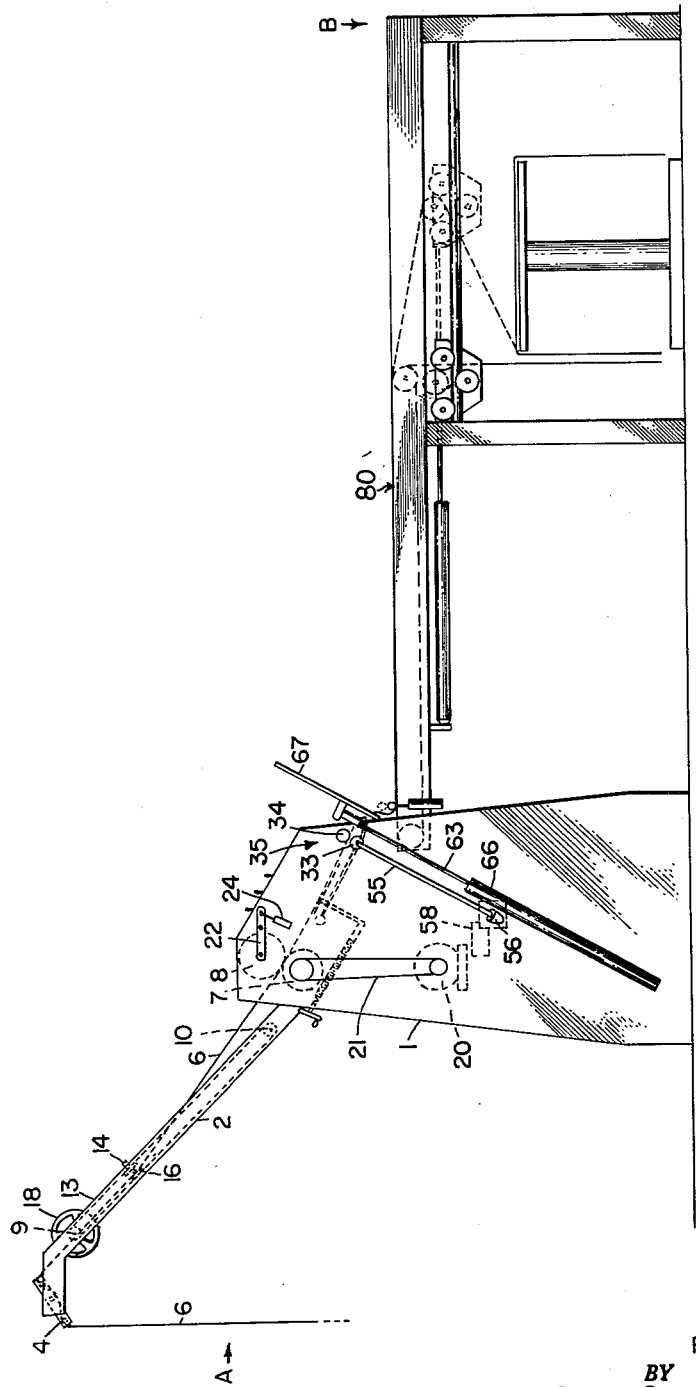

July 6, 1965   R. W. SIMMONS   3,192,811
FABRIC STRAIGHTENING AND CUTTING DEVICE
Filed July 10, 1961   5 Sheets-Sheet 2
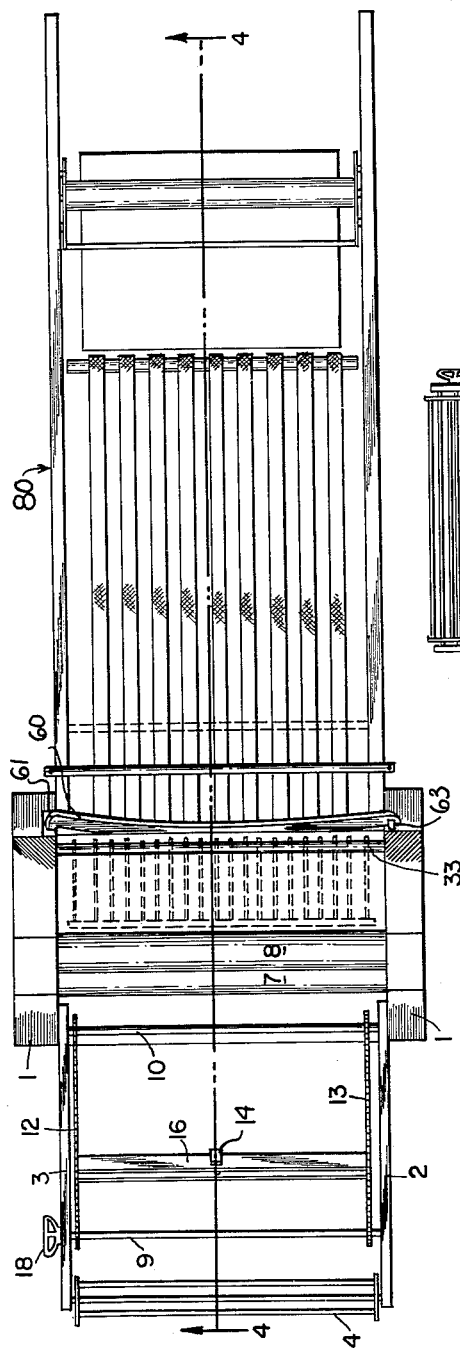
INVENTOR.
REID W. SIMMONS
BY
Ezekiel Wolf, Wolf & Greenfield
ATTORNEYS

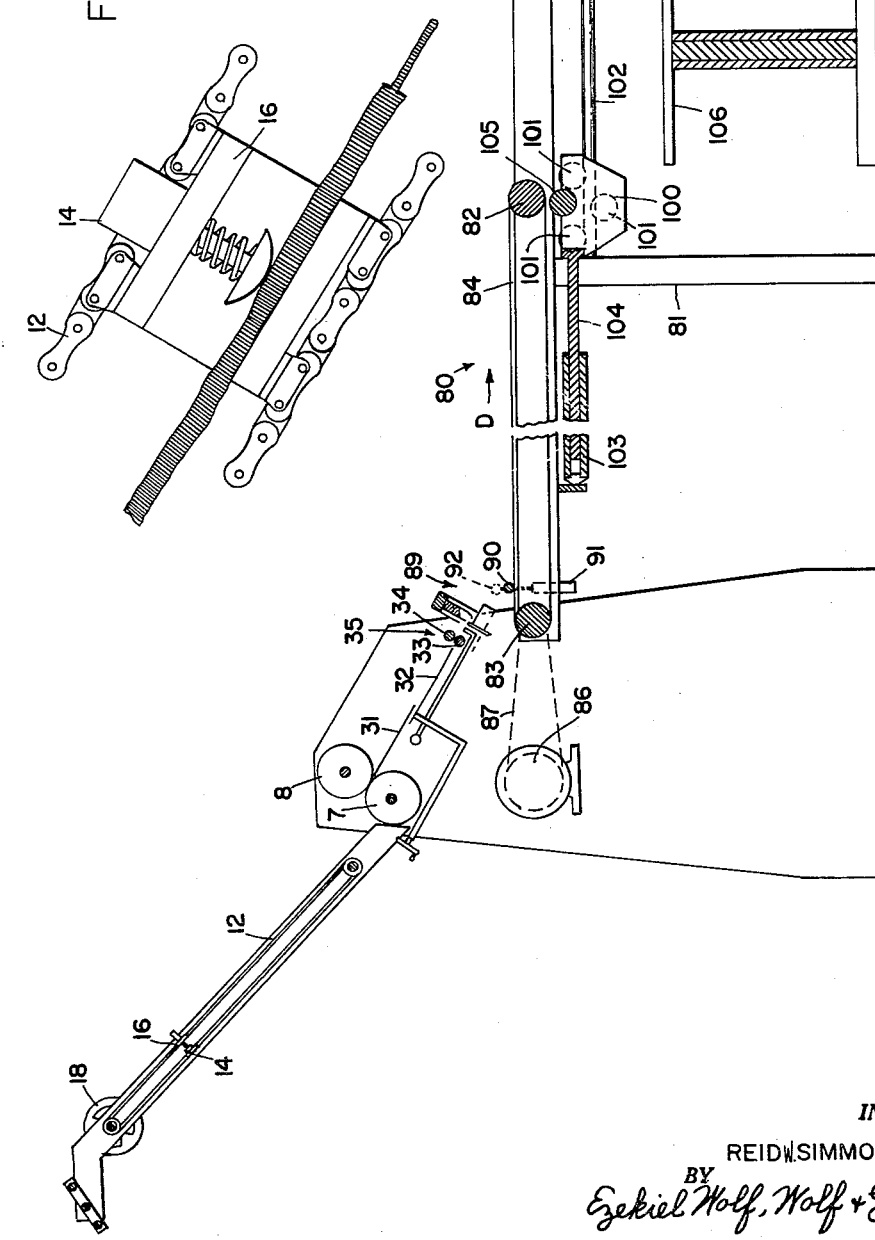

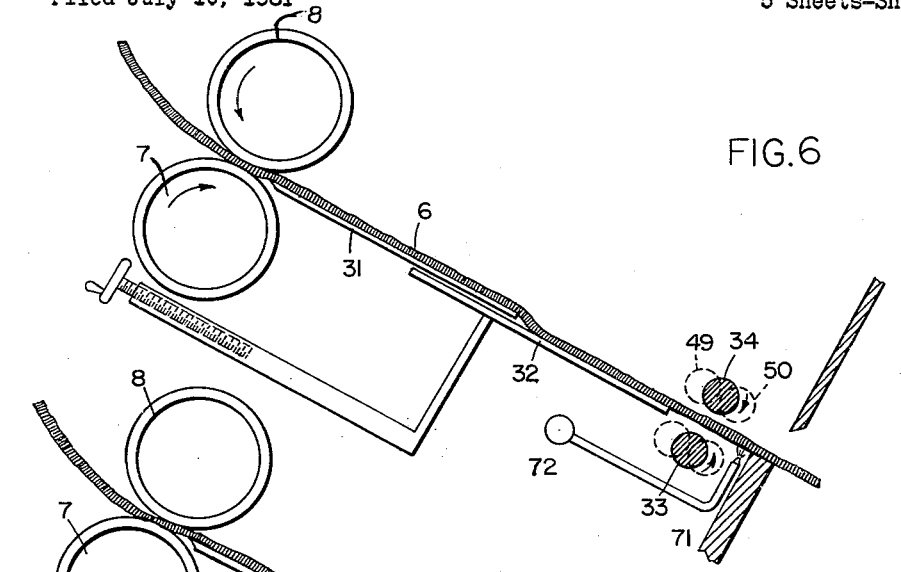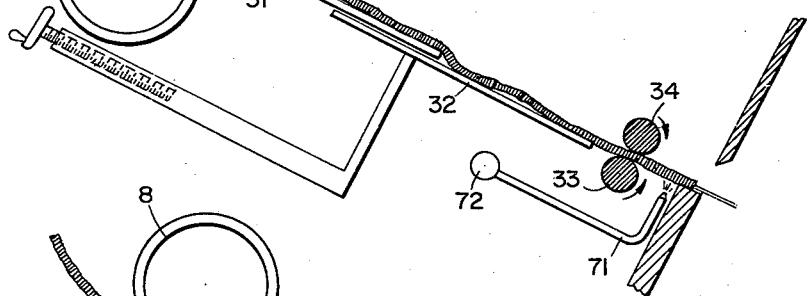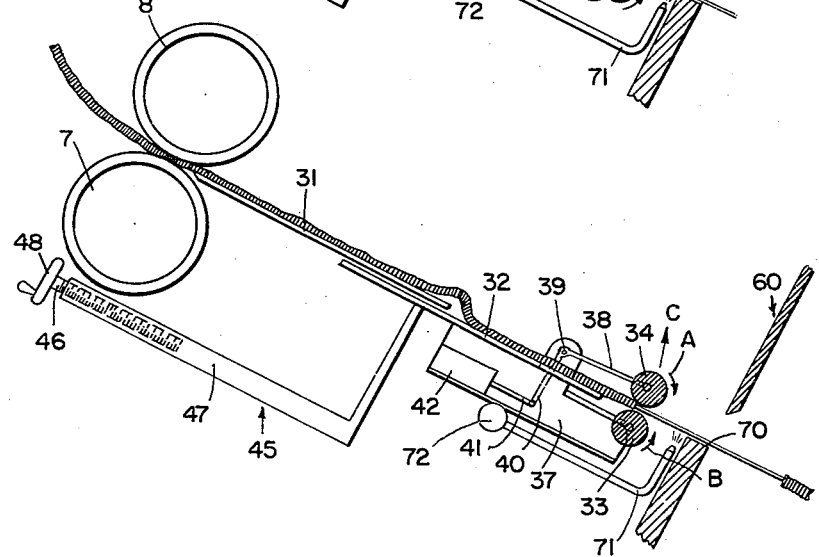

United States Patent Office 3,192,811
Patented July 6, 1965

3,192,811
FABRIC STRAIGHTENING AND CUTTING DEVICE
Reid W. Simmons, Deerfield, Fla., assignor, by mesne assignments, to Sjostrom Automations, Inc.
Filed July 10, 1961, Ser. No. 123,409
12 Claims. (Cl. 83—175)

The present invention relates to a machine for successively severing sections of flexible material from a continuous length of flexible material. In particular, the present invention is concerned with a machine adapted to cut individual sheets, such as towels or the like from a continuous length of a fabric or fabric-like material.

Towels and similar articles are made from a continuously woven length of material having spaced successive transverse bands more densely woven and thinner than portions intermediate the bands. Individual towels are cut by severing sections from the length along these bands which thereafter form selvage edges of the towels. Attempts to provide means for automatically cutting the sections midway between each of the bands have been relatively unsuccessful. This is because these transverse bands are not uniformly straight and parallel when unrolled from a continuous roll of material. Successive bands are usually non-uniformly bowed or wiggly. Consequently it has been necessary to cut these sections by hand so that the operator may follow the center of the band accurately by actually watching where the cut is being made.

The present invention provides an automatic method for cutting successive sections of toweling from a length which is interrupted by bands of the type described. The operation is automatic and quick, with the cuts selectively spaced from the edges which define the transverse band.

An object of the present invention is to provide a means for automatically cutting towels and the like from a continuous length of material more rapidly than heretofore possible by hand means.

In the present invention there is provided feed means for continuously feeding a continuous length of fabric material in a forward direction. These means preferably comprise a pair of parallel feed rolls between which the flexible material passes. The fabric material is fed forwardly through straightening means until engaged by engaging means. The straightening means, preferably comprising a pair of elongated rolls, are positioned on either side of the fabric intermediate the feed and engaging means. These elongated rolls are mounted for rotation in a direction opposite to the direction of rotation of the feed rolls. After the fabric material is fed between the straightening rolls to a position in which the straightening rolls are just rearward of one of the bands extending transversely of the fabric, the straightening rolls are moved together. The fabric material engaged by the straightening rolls is backed up. It has been found that the transverse band will be moved to a position directly underneath the straightening rolls and will simultaneously be straightened into parallel relation with the straightening rolls. A knife or shear positioned forwardly of the straightening rolls then cuts or shears the fabric material through the band along a line parallel to the axis of the straightening rolls. Means then move the cut section from the machine.

Figure 9:
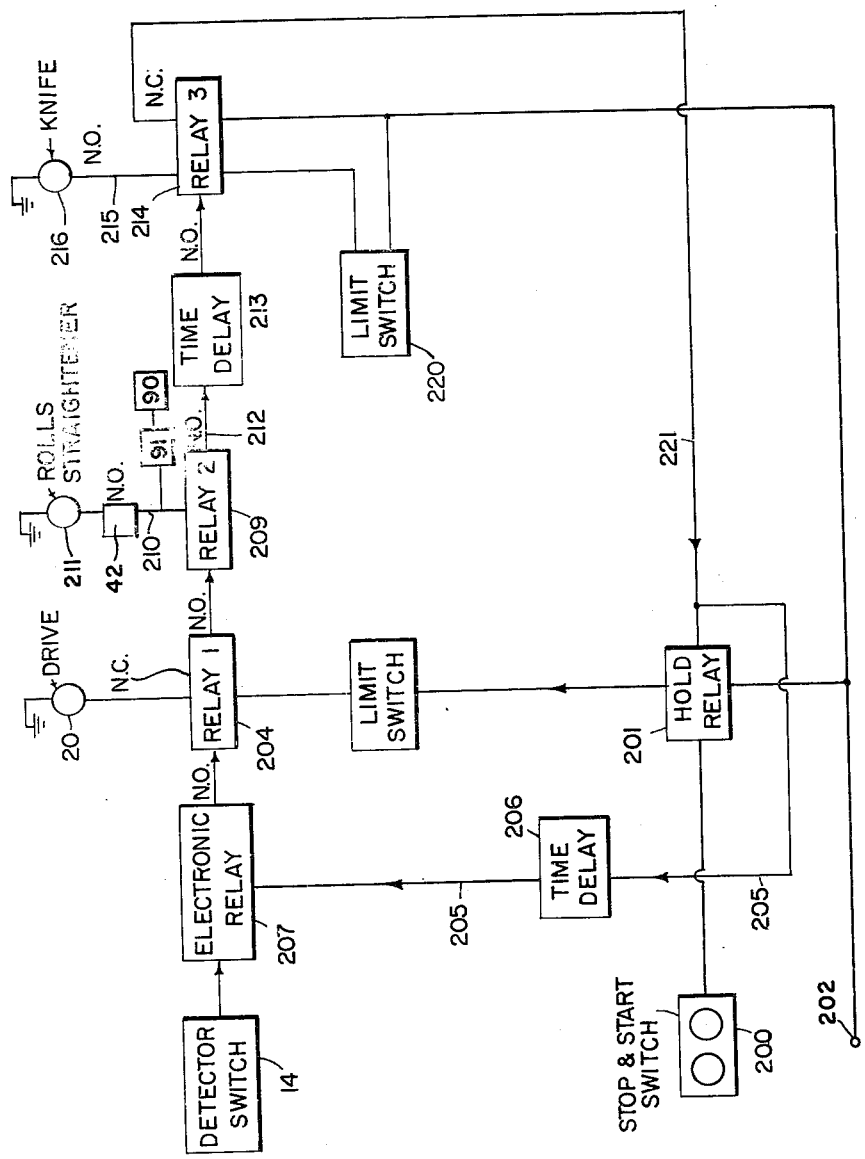

These and other objects and advantages of the present invention will be more clearly understood when considered in conjunction with the accompanying drawings, in which:

FIG. 1 is a side elevational view of the machine;
FIG. 2 is a top plan view of the machine;
FIG. 3 is a front end view of the machine;
FIG. 4 is a view taken along the line 4—4 of FIG. 2;
FIG. 5 is fragmentary cross sectional detail of the machine;
FIGS. 6, 7 and 8 are schematic drawings of portions of the machine illustrating its operation; and,
FIG. 9 is a schematic view of the electrical circuit.

As described in this invention, the end indicated at A (see FIG. 1) shall be considered the rear end of the machine, while the end indicated B shall be considered the forward end of the machine. Suitably supported on a frame 1 are a pair of upwardly and rearwardly inclined supporting arms 2 and 3. These spaced arms 2 and 3 support transverse tension bars 4 through which a continuous length of fabric 6 or other similar material may pass. The tension bars 4 which may comprise three in number are adapted to straighten the fabirc 6 being fed through them. Frames 2 and 3 also support actuating means which detect successive elongated transverse thin bands of material for purposes of subsequently actuating a shearing blade which severs successive sections of fabric from the length. This actuating means is best illustrated in FIGS. 1, 2 and 4. A pair of transverse rotatable shafts 9 and 10 journalled respectively in the frames 2 and 3 support a pair of sprockets and a chain on each side as illustrated at 12 and 13. Handwheel 18 is fixed to shaft 9 and is adapted to permit rotation. A microswitch assembly 14 (see FIGS. 2 and 5) is mounted on a transversely extending bar 16, in turn secured at its ends to the upper portions of the chains. Thus, by turning wheel 18, the switch 14 may be moved forwardly and rearwardly to selected positions.

A pair of feed rolls 7 and 8 are suitably journalled in frame 1. Feed roll 7 is connected for rotation to a power source such as motor 20 also mounted on frame 1, through a sprocket and chain drive 21. The feed roll 7 drives feed roll 8 which may be rubber coated for frictional engagement. The journal supports for feed roll 8 comprise journal means supported on an end of levers 22. These levers 22 are in turn pivotally supported on the frame and are connected at their ends to solenoids 24. Actuation of the solenoids 24 cause the roll 8 to be raised for threading the fabric 6 between the rolls 7 and 8.

Positioned forwardly and on a level lower than rolls 7 and 8 is straightening means 35. Interposed between the straightening means 35 and rolls 7 and 8 are inclined stainless steel plates 31 and 32 over which the fabric length is adapted to slide. Straightening means 35 comprises a pair of elongated straightening rolls 33 and 34. These rolls are supported parallel to one another transverse to the length of the fabric 6. Each of the rolls is journalled at its ends for positive rotation in the direction of arrows A and B (see FIG. 8). Roll 33 is journalled at its ends on supporting frames 37, while roll 34 is journalled at its ends on levers 38. Levers 38, one at each side, are in turn each pivotally supported at 39 to one of the pair of frames 37 with the other ends 40 of the levers 38 pivotally interlocked with the armatures 41 of the solenoids 42. The solenoids 42 are also secured rigidly to the frames 37. These solenoids on actuation are adapted to separate rolls 33 and 34 by moving roll 34 in the direction of arrow C (FIG. 8). The frames 37 are in turn secured to the end plate 32 with the plate 32 suitably supported at its sides in channels for reciprocal longitudinal sliding movement with respect to plate 31. Means 45 are provided for expansion of the overall length of plates 31 and 32. This comprises a threaded shaft 46 engaging the internally threaded member 47. The shaft 46 having a handle 48 is journalled to a cross bar (not shown) in turn attached to the frame. By rotating handle 48, the plate 32 is moved longitudinally, carrying with it rolls 33 and 34. These rolls 33, 34, may be moved over a distance illustrated best in FIG. 6 by the dotted outlines 49 and 50. The plates 31 and 32 provide an inclined plane over which the fabric may be spread before straightening.

Rolls 33 and 34 are each independently rotated by separate drive means. Both these drive means are similar with one of these drive means illustrated in FIG. 1. A suitable gear transmission couples roll 33 to rotatable shaft 55, in turn coupled at its other end through a suitable gear box 56 to a power source 58. The shaft 55 and transmission should be of the type to permit adjusting movement of rolls 33, 34, as described. For this purpose shaft 55 may be pivotable about gear box 56 to reciprocate in a counterclockwise and clockwise direction. The rolls 33 and 34 may be journaled in slots in the frame for movement as illustrated in FIG. 6. Further, universal joints may be used to assure a suitable connection between rolls 33 and 34 and their respective rotatable shafts. Positioned forwardly of the straightening rolls 33 and 34 is the guillotine or shear 60. This shear 60 extends entirely across the machine and is adapted on actuation to slice material passing thereunder in a single stroke. The shear 60 is suitably journalled at 61 on the frame. The other end 62 is pivotally connected to an actuating arm in turn connected to the operating shaft 63 of the hydraulic cylinder 66. Upon actuation of the cylinder, shaft 63 draws the shear downwardly with the shear being guided against the guiding bar 67 also fixed to the frame of the machine. The shearing edge 70 (FIG. 8) of the shear 60 is positioned immediately forward of the straightening rolls 33 and 34 with the upper portion of the shearing edge 70 in alignment with the space between rolls 33 and 34.

Interposed between rolls 33 and 34 and the shearing edge 70 are a plurality of tubes 71 through which air from air pressure source 72 is pumped. This upward flow of air between shearing edge 70 and roll 33 lifts the fabric material passing between rolls 33, 34 over the edge 70.

Extending forwardly of the shear 60 is the conveyor belt table 80 (FIG. 4). This table comprises a frame 81 having journalled therein aligned rotatable rolls 82 and 83 around which a plurality of conveyor belts 84 extend. These belts are moved continuously in the direction of arrow D by power supplied from the motor 86 in turn coupled through chain drive 87 to the roll 83, or by other suitable means. Means for maintaining a forward tension of the fabric is illustrated generally at 89. This comprises a bar 90 actuated by solenoid 91 and extends across the belts 84, and is adapted upon energization of solenoid 91 to move downwardly from the position indicated in dotted outline at 92 (FIG. 4), against the belts 84 to engage and hold taut lengths of fabric passing thereunder.

A carriage 100 supporting the rotatable transverse roll 105 is adapted to reciprocate forwardly and rearwardly on rails 102 positioned at either side of the frame with the carriage 100 supported by wheels 101, in turn journalled at the sides of the carriage 100. The carriage is reciprocated by means of a hydraulic drive 103 supported on the frame 81, and connected to the carriage by shaft 104. Actuation of the hydraulic drive 103 is synchronized to the operation of the shear 60 and moving belts 84, so that the carriage moves forwardly from under roll 82 as a severed section of the length of flexible material moves off the belts 84. The forwardly moving roll 105 engages the underside of the severed section of fabric and carries it forwardly over table 106. As the severed section continues to fall from the belts 84 it is deposited on top of the table 106. Synchronized operation of the various positions of the machine may be effected through suitable electrical controls as illustrated schematically in FIG. 9. The machine is started by switch 200. This closes a circuit through the hold relay 201 from power source 202 and normally closed relay 204 to actuate motor 20, which in turn causes rolls 7 and 8 to draw the fabric 6 forwardly. Simultaneously a circuit is completed from power source 202, hold relay 201, line 205, time delay relay 206, relay 207, and detector microswitch 14. As the fabric moves forwardly the switch 14 detects a thin transverse band. The switch has previously been positioned so that it will detect a second of two bands when the first or leading band has just passed beyond the straightening rolls 33, 34. Up to the time switch 14 detects a thin band relay 207 is normally open. When a thin band is detected by switch 14 a circuit is completed through lines 205, relays 207 and 204, relay 209, line 210 and solenoid 42. At this instance the contact in relay 204 switches from the N.C. (normally closed) to N.O. (normally open) terminal, thereby disconnecting motor 20 and stopping rotation of feed rolls 7, 8. At the same time solenoid 42 causes rolls 33, 34 to move together. Simultaneously solenoid 91 is actuated through line 210 closing bar 90. These rolls 33, 34 are continuously rotated. When they come together they engage the thicker parts of the fabric and back them up in a sequence illustrated in FIG. 6 to FIG. 8 until the initial band lies beneath the rolls 33, 34. At this time the band is parallel to the rolls 33, 34. A circuit is also closed through lines 212, time delay relay 213, relay 214, line 215, and solenoid 216. When rolls 33, 34 move together, solenoid 216 controls the air valve of air cylinder 66 so that after a time delay determined by relay 213, the cylinder 66 is actuated causing the shear 60 to cut the material beneath it. Parameters are chosen so that time delay is sufficient to permit straightening of the band. The rolls 33, 34 have previously been adjusted a sufficient distance from shear edge 70, so that the band when straightened will be directly over the edge 70, thereby permitting shearing of the band through its center. When the shear closes cutting the section of fabric, it also closes limit switch 220 which in turn switches relay 214 from its normally open to normally closed line. This disengages solenoid 216 and also cuts out hold relay 201 through line 221. Microswitch 14 is reset when hold relay 201 is cut out after a time delay determined by time delay relay 206. This permits passages of multiple designs beyond the microswitch before it is reset. A solenoid, not shown, may also be actuated by a switch when shear 60 closes to release air through an air valve controlling air cylinder 103, thus causing reciprocal movement of carriage 100.

Thus fabric passing over the tension frame is drawn forwardly by feed rolls 7, 8. The leading edge of the length passes between straightening rolls 33, 34 over shearing edge 70 and on to forwardly moving belts 84. When the first band has just passed rolls 33, 34, the second band is detected by microswitch 14. The microswitch 14 stops the rolls 7, 8, causing rolls 33, 34 to close together, draws bar 90 downwardly, pressing the fabric against the belts 84, and actuates the shear 60 after a time delay. The time delay is sufficient to permit rolls 33, 34 to back up the fabric until the leading band is centered over the edge 70. The shear then cuts the fabric in the center of the band. On closing, the shear trips a limit switch which resets and recycles the machine and also causes reciprocal movement of the air cylinder 103.

What I claim is:

1. A device for severing successive sections from a continuous length of flexible material along transverse lines coincident with transverse elongated portions having a thickness less than other portions of said material comprising, feeding means for feeding said continuous length forwardly, straightening means positioned in spaced relation to said feeding means and through which said flexible material is adapted to pass, means for maintaining a forward tension on said material, said straightening means comprising a pair of straightener rolls parallel with one another and positioned on either side of and transversely to said forward moving length, means for rotating said straightener rolls in a direction opposite to said forward movement and means for causing intermittent engagement of said rolls with said continuous length, said intermittent engagement being at intervals in accordance with the location of one of said elongated portions, to restrain the forward movement of and move said other portions of said material rearwardly to align one of said elongated portions with said straightener rolls, and means for transversely cutting said length along said one elongated portion.

2. A device for severing successive sections from a continuous length of flexible material along transverse lines coincident with transverse elongated portions having a thickness less than other portions of said material comprising feeding means for feeding said continuous length forwardly, means for maintaining a forward tension on said length in an area forward of said feeding means, a pair of straightener rolls parallel with one another and positioned in spaced relation on either side of and transversely to said forwardly moving length, intermediate said feeding means and said means for maintaining a forward tension, means for intermittently actuating said rolls in accordance with the location of one of said elongated portions to engage said forwardly moving length as it passes therethrough, means for continuously rotating said straightener rolls so that when engaged with said material they rotate against said length in a direction opposite to said forward movement and thereby restrain the forward movement of and move said other portions of said material rearwardly to align one of said elongated portions with said straightener rolls, means for actuating said feeding means to discontinue the feeding of said material upon actuation of said rolls to material engaging position, and means for transversely cutting said length along said one elongated aligned portion.

3. A device as set forth in claim 2, wherein said means for transversely cutting comprises a shear extending across said length.

4. A device for severing successive sections from a continuous length of flexible material along transvere lines coincident with transverse elongated portions having a thickness less than other portions of said material comprising feeding means for feeding said continuous length forwardly, means for maintaining a forward tension on said length forward of said feeding means comprising an endless conveyor belt adapted to engage and support the forward end of said length as it moves forwardly, means for moving the length engaging surface of said belt in a forward direction, a pair of parallel straightener rolls positioned in spaced relation transversely on either side of said length intermediate said feeding means and said means for maintaining a forward tension, means for adjusting said spaced relation of said straightener rolls in accordance with the location of one of said elongated portions to engage said length as it moves therebetween, means for continuously rotating said straightener rolls so that when engaged with said material they rotate against said length in a direction opposite to said forward movement and thereby restrain the forward movement of and move said other portions of said material rearwardly to align one of said elongated portions with said straightener rolls, means for actuating said feeding means to discontinue the feeding of said material upon actuation of said rolls to material engaging position, and means for transversely cutting said length along said one elongated aligned portion.

5. A device as set forth in claim 4, wherein said feeding means comprises a pair of feed rolls positioned transverse to said length and on either side thereof.

6. A device for severing successive portions from a continuous length of flexible material along transverse lines each coincident with one of a succession of transverse spaced elongated portions having a textural consistency differing from other portions of said material comprising, a first and a second means positioned in spaced relation for forward movement of said length, straightening means positioned intermediate said first and second means for intermittently engaging and moving said other portions of said length rearwardly to align a first one of said elongated portions with said straightening means, and means for engaging and disengaging said straightening means with said other portions including detecting means positioned rearward of said straightening means for detecting a second of said elongated portions as it passes thereby, and means operable by said detecting means upon detection of said second elongated portion for causing said straightening means to engage said other portions in an area adjacent said one elongated portion, whereby said one elongated section will be aligned with said straightening means, and means for severing a section of said length along said one elongated section after said alignment thereof.

7. A device as set forth in claim 6, wherein said straightening means comprises at least one roller extending transversely of said length, and said means for engaging said straightening means includes means for moving said roller normal to said length.

8. A device as set forth in claim 7 having a cross bar positioned forwardly of said severing means forming a part of said second means, and means for actuating said cross bar to engage said length prior to actuation of said severing means.

9. A device for severing successive sections from a continuous length of flexible material along transverse lines coincident with transverse elongated portions having a thickness less than other portions of said material comprising feeding means for feeding said continuous length forwardly, means for maintaining a forward tension on said length forward of said feeding means comprising an endless conveyor belt adapted to engage and support the forward end of said length as it moves forwardly, means for moving the length engaging surface of said belt in a forward direction, a pair of parallel straightener rolls positioned in spaced relation transversely on either side of said length intermediate said feeding means and said means for maintaining a forward tension, lever means rotatably supporting at least one of said rolls for movement normal to said length whereby said spaced relation may be intermittently adjusted for engagement with said length, carriage means supporting said straightener rolls for adjusting movement longitudinal of said length, means for continuously rotating said straightener rolls so that when engaged with said material they rotate against said length in a direction opposite said forward movement and thereby restrain the forward movement of and move said other portions of said material rearwardly to align one of said elongated portions with said straightener rolls, means for actuating said feeding means to discontinue the feeding of said material upon actuation of said rolls to material engaging position, a shear extending across said length and means for actuating said shear when said one elongated portion is aligned with said straightener rolls.

10. A device as set forth in claim 9 having air blast means for positioning the forward end of said length under said shear.

11. A device as set forth in claim 6 having means adjustably supporting said detecting means for movement toward and away from said straightening means for adjusting said device for cutting sections of different lengths.

12. A device as set forth in claim 4, wherein said means for rotating said straightening rolls comprise independent drive means for each of said rolls.

References Cited by the Examiner
UNITED STATES PATENTS

| 10,132 | 10/53 | Griswold | 83—18 |
| 751,560 | 2/04 | Robinson | 83—251 |
| 857,540 | 6/07 | Robinson | 83—175 |
| 2,539,372 | 1/51 | Metzler | 83—18 |
| 2,716,266 | 8/55 | MacIssac et al. | 26—51.4 |
| 2,939,354 | 6/60 | King | 83—165 |
| 2,966,086 | 12/60 | Sjostrom | 83—175 |

DONALD W. PARKER, *Primary Examiner.*